(12) United States Patent
Butterstein et al.

(10) Patent No.: US 12,405,865 B1
(45) Date of Patent: Sep. 2, 2025

(54) RECOVERY OF A TARGET DATABASE SYSTEM

(71) Applicant: INTERNATIONAL BUSINESS MACHINES CORPORATION, Armonk, NY (US)

(72) Inventors: Dennis Butterstein, Leinfelden-Echterdingen (DE); Sabine Perathoner-Tschaffler, Nufringen (DE); Antje Dengler, Boeblingen (DE); Brigitte Gößler, Wildberg (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/766,873

(22) Filed: Jul. 9, 2024

(30) Foreign Application Priority Data

Jun. 10, 2024 (GB) ...................................... 2408201

(51) Int. Cl.
 *G06F 7/00* (2006.01)
 *G06F 11/14* (2006.01)
 *G06F 17/00* (2019.01)

(52) U.S. Cl.
 CPC ...... *G06F 11/1469* (2013.01); *G06F 2201/80* (2013.01)

(58) Field of Classification Search
 None
 See application file for complete search history.

(56) References Cited

U.S. PATENT DOCUMENTS

| | | |
|---|---|---|
| 7,996,716 B2 | 8/2011 | Butterworth |
| 11,249,983 B2 | 2/2022 | Kumar et al. |
| 11,442,815 B2 | 9/2022 | Kanp et al. |
| 11,461,190 B2 | 10/2022 | Shemer et al. |

(Continued)

FOREIGN PATENT DOCUMENTS

CN 107229540 A 10/2017

OTHER PUBLICATIONS

IBM, "Smarter Business Dynamic Information with IBM InfoSphere Data Replication CDC", ibm.com/redbooks, Mar. 2012, 484 Pages, https://www.redbooks.ibm.com/redbooks/pdfs/sg247941.pdf.

(Continued)

*Primary Examiner* — Tuan A Pham
(74) *Attorney, Agent, or Firm* — James L. Olsen

(57) ABSTRACT

Aspects of the present disclosure relate to recovery of a target database system. The method comprises receiving multiple batches of database transactions to form the target database system. The method further comprises generating a single recovery bookmark before beginning processing of a current batch, wherein the single recover bookmark comprises: an earliest open entry for a previous batch, a latest commit entry for the previous batch, an earliest open entry for the current batch, a latest commit entry for the current batch, a transactional identifier, and list of tables to be processed; performing the sequence of database transactions; replacing the list of tables from the single recovery bookmark with a flag value upon completion; detecting a fault condition during the performance of the sequence of database transactions; recovering the target database system using the single recovery bookmark; and resuming the sequence of database transactions.

20 Claims, 8 Drawing Sheets

(56) References Cited

U.S. PATENT DOCUMENTS

| | | | |
|---|---|---|---|
| 2017/0255529 A1* | 9/2017 | Kedia | G06F 11/1451 |
| 2019/0294723 A1 | 9/2019 | Kedia et al. | |
| 2020/0320059 A1 | 10/2020 | Kumar et al. | |
| 2021/0064482 A1 | 3/2021 | Shemer et al. | |
| 2021/0334168 A1* | 10/2021 | Kanp | G06F 16/2365 |
| 2022/0382651 A1 | 12/2022 | Lu et al. | |
| 2024/0256398 A1 | 8/2024 | Manchale et al. | |

OTHER PUBLICATIONS

Intellectual Property Office, Patents Act 1977: Search Report under Section 17(5), Oct. 21, 2024, 3 Pages, GB Application No. 2408201.8.

Intellectual Property Office, Patents Act 1977: Search Report under Section 17(5), Oct. 21, 2024, 3 Pages, GB Application No. 2408221.6.

* cited by examiner

RECOVERY OF A TARGET DATABASE SYSTEM

BACKGROUND

The present invention relates to replication in database systems.

An analytics accelerator for a database system is a specialized tool or platform designed to significantly enhance the performance and efficiency of complex analytical queries and data processing tasks. By utilizing techniques such as in-memory processing, optimized storage, parallel computing, and/or intelligent indexing, the accelerator can rapidly process large volumes of data and deliver insights in real-time or near-real-time. This enables the performance sophisticated analytics, such as data mining, predictive modeling, and trend analysis, more quickly and effectively, thereby improving decision-making and operational efficiency across various functions.

SUMMARY

In one aspect a computer-implemented method of recovery of a target database system is disclosed. The method comprises receiving multiple database tables from a source database system to form the target database system. The method further comprises receiving multiple batches of database transactions. A batch of the multiple batches comprise a sequence of database transactions. The method further comprises generating, for a current batch of the multiple batches of database transactions, a single recovery bookmark before beginning processing of the current batch. The single recovery bookmark comprises: an earliest open entry for a previous batch of the multiple batches of database transactions, a latest commit entry for the previous batch, an earliest open entry for the current batch, a latest commit entry for the current batch, a transactional identifier of the current batch, and a list of tables to be processed in the current batch. The multiple database tables comprise tables in the list of tables.

The method further comprises performing the sequence of database transactions for the current batch on the target database using the transactional identifier of the current batch. The method further comprises replacing the list of tables from the single recovery bookmark with a flag value upon completion of performing the sequence of database transactions for the current batch. The method further comprises detecting a fault condition during the performance of the sequence of database transactions for the current batch.

The method further comprises recovering the target database system according to a recovery protocol using the single recovery bookmark if the fault condition is detected unless the list of tables is set to the flag value. The method further comprises resuming the performance of the sequence of database transactions for the current batch after recovery of the target database system or if the list of tables is set to the flag value.

In another aspect a computer program product comprising a computer-readable storage medium having computer-readable program code embodied therewith is disclosed. The computer-readable program code is configured to implement an example of the method or computer-implemented method.

In another aspect a computer system is disclosed. The computer system comprises a processor configured for controlling the computer system. The computer system further comprises a memory storing machine-executable instructions. Execution of the instructions causes the processor to receive multiple data tables from a source database system to form the target database system. The execution of the instructions further causes the processor to receive multiple batches of database transactions. A batch of the multiple batches comprise a sequence of database transactions.

Execution of the machine-executable instructions further causes the processor to generate, for a current batch of the multiple batches of database transactions, a single recovery bookmark before beginning processing of the current batch. The single recovery bookmark comprises: an earliest open entry for a previous batch of the multiple batches of database transactions, a latest commit entry for the previous batch, an earliest open entry for the current batch, a latest commit entry for the current batch, a transactional identifier of the current batch, and a list of tables to be processed in the current batch. The multiple database tables comprise tables in the list of tables.

Execution of the machine-executable instructions further causes the processor to perform the sequence of database transactions for the current batch on the target database using the transactional identifier of the current batch. Execution of the instructions further causes the processor to replace the list of tables from the single recovery bookmark with a flag value upon completion of performing the sequence of database transactions for the current batch. Execution of the instructions further causes the processor to detect a fault condition during the performance of the sequence of database transactions for the current batch. The execution of the instructions further causes the processor to detect a fault condition during the performance of the sequence of database transactions for the current batch.

The execution of the instructions further causes the processor to recover the target database system according to a recovery protocol using the single recovery bookmark if the fault condition is detected and unless the list of tables are set to the flag value. Execution of the instructions further causes the processor to resume the performance of the sequence of database transactions for the current batch after recovery of the target database system or if the list of tables is set to the flag value.

BRIEF DESCRIPTION OF THE DRAWINGS

In the following embodiments of the invention are explained in greater detail, by way of example only, making reference to the drawings in which.

DETAILED DESCRIPTION

Figure 1:
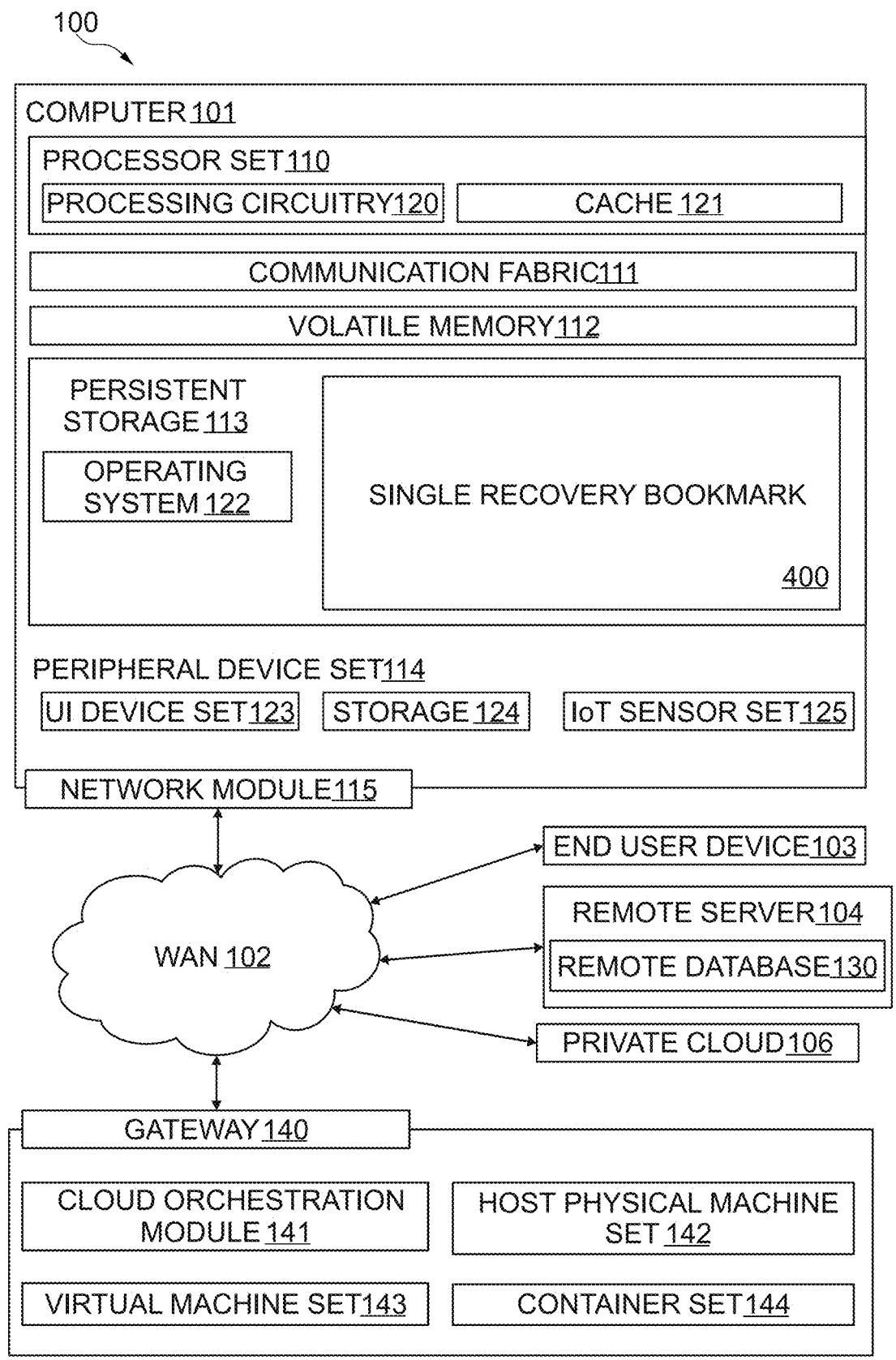
FIG. 1 illustrates an example of a computing environment, in accordance with embodiments of the present disclosure.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one example a computer-implemented method of recovery of a target database system is disclosed. The target database system may be an analytics accelerator for a source database system. The method can comprise receiving multiple database tables from a source database system to form the target database system. The source database system may for example be formed from various transactional database tables or systems which may for example be used for time-sensitive transactions. It may be impractical to perform complex SQL queries or other analytics on the source database system directly. The forming of the target database system may provide for a more efficient and effective means of performing analytics on the underlying multiple database tables.

The method can further comprise receiving multiple batches of database transactions. The batches of database transactions may for example be database transactions for updating the target database system in response to changes in the underlying multiple database tables of the source database system. At least some of the multiple batches of database transactions can comprise a sequence of database transactions.

In current systems there may be multiple threads which operate on updating the target database system using the multiple batches of database transactions. In this case, they may use a bookmark for each thread which is active. A disadvantage of doing this however is that if there is a crash or fault during the updating of the target database system with the multiple batches of database transactions, it may be necessary to completely reload the multiple database tables from the source database system. This may be costly and time-consuming. In embodiments, the single recovery bookmark is used and provides a means for recovering the target database system without the need to completely reload the multiple database tables.

The single recovery bookmark can comprise: an earliest open entry for a previous batch of the multiple batches of database transactions, a latest commit entry for the previous batch, an earliest open entry for the current batch, a latest commit entry for the current batch, a transactional identifier of the current batch, and lists of tables to be processed in the current batch. The entries refer to entries in a log table of the source database system. When the updating is performed a transactional identifier can be assigned to the current batch. In database systems where multi-table transactions are not supported and there are no transactional guarantees given for batch processing, the use of the transactional identifier allows the determination of whether a transaction has occurred or not after the fault condition is detected. For example, when such databases are updated, they may record the latest transactional identifier used. The list of tables to be processed in the current batch lists the tables that are affected. For example, if it is then desired to check if a particular change to a database has been replicated to the target database has been made or not, the table and the list of tables can be scanned for the particular transactional identifier. The multiple database tables comprise the tables in the list of tables.

As the database tables in the target database system are updated the transactional identifier can be logged. The method can further comprise replacing the list of tables from the single recovery bookmark with a flag value upon completion of performing the sequence of database transactions for the current batch. In this operation, the list of tables which are used for a particular batch are replaced with a flag value. For example, the flag value could be set to "NULL" or any predetermined chosen value. When the flag value is set to this predetermined value, it is known that this particular batch has been finished.

The method can further comprise detecting a fault condition during the performance of the sequence of database transactions for the current batch. A fault condition as used herein encompasses any condition or situation which may have caused the updates to the target database system using the multiple batches of database transactions to not have occurred or have an error. The method can further comprise recovering the target database system according to a recovery protocol using the single recovery bookmark if the fault condition is detected unless the list of tables is set to the flag value. If the list of tables is set to the flag value, then it is known that the particular batch of multiple batches has been completed. If the flag is not set, then the recovery protocol is used.

The method can further comprise resuming the performance of the sequence of database transactions for the current batch after recovery of the target database system if the list of tables is set to the flag value.

Embodiments of the present disclosure provide a number of benefits. For example, as mentioned above, embodiments of the present disclosure can save users of the target database system from having to reload the multiple database tables in the case of a fault. The database system may for example be a system which records or charges for CPU usage by the user of the target database system. In such instances, re-replicating the multiple database tables from the source database system may be expensive and time-consuming. Another potential advantage is that embodiments of the present disclosure avoid outages; reloading a table means the table will no longer be up to date until it is reloaded. This means that the resulting table can no longer be used for applications requiring the most current data.

Another advantage is that the use of the single recovery bookmark and the recording of the transactional identifier may enable one to discover what happened during a fault condition.

In another example, the single recovery bookmark of the examples described herein may be embodied as a data structure, such as a computer-implemented data structure or data format embodied on a medium.

In another example, the recovery protocol can comprise bypassing the recovery protocol if the transactional identifier of the current batch has been committed to all tables in the list of tables. If the transactional identifier is recorded in a particular table then it can be understood that the transactions associated with this transactional identifier have taken place. If they have been committed to all tables then the forming of the sequence of database transactions for the current batch was actually completed.

In another example, the recovery protocol can comprise issuing a rollback of transactions having the transactional identifier of the current batch that were made to tables in the list of tables. The recovery protocol further comprises copying the earliest open entry for the previous batch to the earliest open entry for the current batch. The recovery protocol further comprises copying the last commit entry for the previous batch to the last open entry for the current batch and then setting the list of tables to the flag value. The process of rolling back the transactions with a particular transactional identifier have thus reset the tables in the target database system to their state before the current batch has started. The other steps reset the single recovery bookmark to a state which emulates its position before the starting of the performing the sequence of database transactions for the current batch. Once the tables are set to the flag value the method can then restarts and re-perform all of the steps for the current batch.

As was mentioned above, this may have the benefit of being able to recover the target database system in environments where multi-tables transactions are not supported.

In another example, the performance of the sequence of database transactions is resumed by restoring the current batch after setting the list of tables to the flag value. This may be accomplished because of the rollback of the transactions having the transactional identifier of the current batch. This provides an effective means of replicating the source database system to the target database system when multi-table transactions are not supported.

In another example, the source database comprises a transaction log. The earliest open for the previous batch is a first open transaction in the transaction log for the previous batch. The latest commit entry for the previous batch is the latest commit transaction in the transaction log for the previous batch. The earliest open entry is a first open transaction in the transaction log for the current batch. The latest commit entry is the latest commit transaction in the transaction log for the current batch. The earliest open entry is the first open entry in the transaction log for a particular batch. Likewise, the latest commit entry for a particular batch is the latest commit entry in the log that occurs.

In another example, the current batch comprises a known number of database transactions. The method further comprises calculating the latest commit entry for a next batch of the multiple batches of database transactions by adding the known number of database transactions to the earliest open entry of the current batch.

In another example, the target database system is implemented using a Hive catalog.

In another example, at least some of the tables in the list of tables is implemented using iceberg tables.

In another example, the fault condition is any one of the following: a crash of the target database system, a restart of the target database system, a power failure in the target database system, or a hardware failure in the target database system. These are all situations which may be recovered using examples of the computer-implemented method.

In another example, the method of recovery of a target database system is a method of disaster recovery.

In another example, the multiple batches of database transactions implement a replication of the source database to the target database.

In another example, the method further comprises continually updating the target database via replication of the source database. This may, for example, be accomplished using the multiple batches of database transactions.

In another example, the target database implements an analytics accelerator for the source database system.

In a further example, the method further comprises providing an analytical or SQL query on the target database after all of the multiple batches of database transactions have been performed and been used to update the target database system.

In another example, the source database system is a transactional database system. For example, by using a transactional database system, there may be certain time and response time requirements pushed onto the source database system. The reloading of the multiple database tables in their entirety may therefore put a stress and be delayed due to the constraints placed on the source database system.

In another example, at least part of the sequence database transactions are parallel database transactions.

In another example, the target database is a single table transaction database system. A single table transaction database system herein encompasses an environment for databases where multi-table transactions are not supported and thus there is no transactional guarantees given for batch processing. This embodiment is significant because although the database system is only a single table transaction database system it is still possible to recover the target database system after a fault condition.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code for implementing the recovery of a target database system using a single recovery bookmark 400. In addition to the single recovery bookmark 400, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored with block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included with block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size).

Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Figure 2:
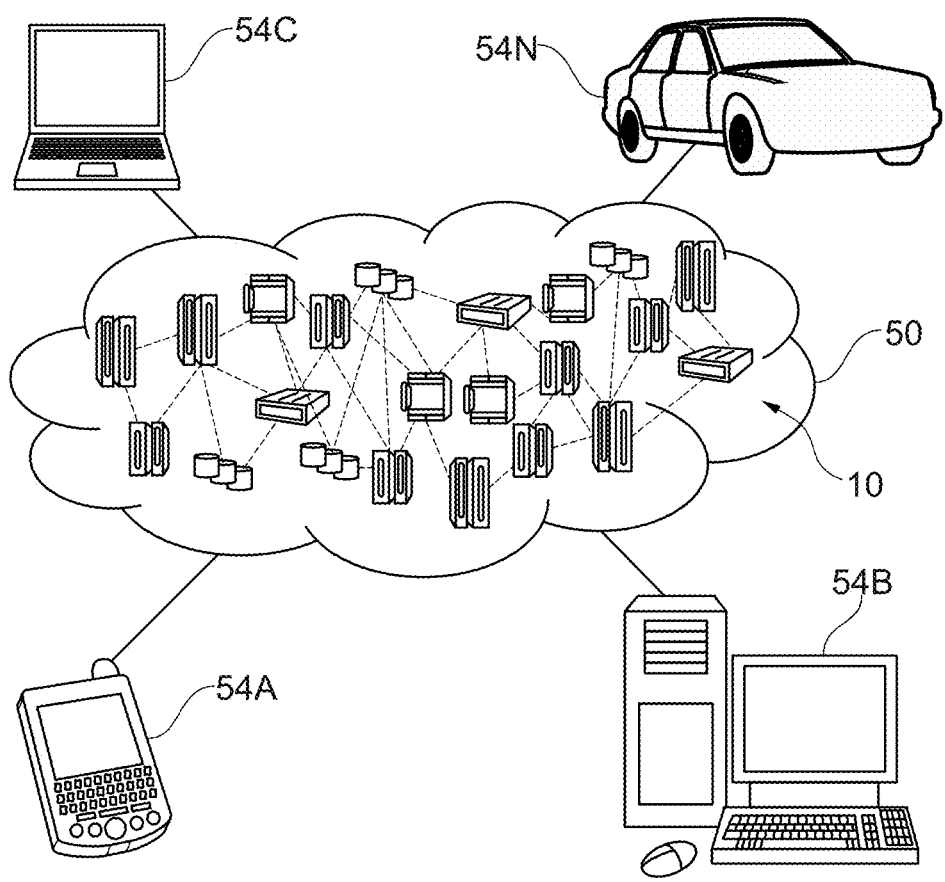
FIG. 2 depicts a cloud computing environment, in accordance with embodiments of the present disclosure.

FIG. 2 It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows: On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service. Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
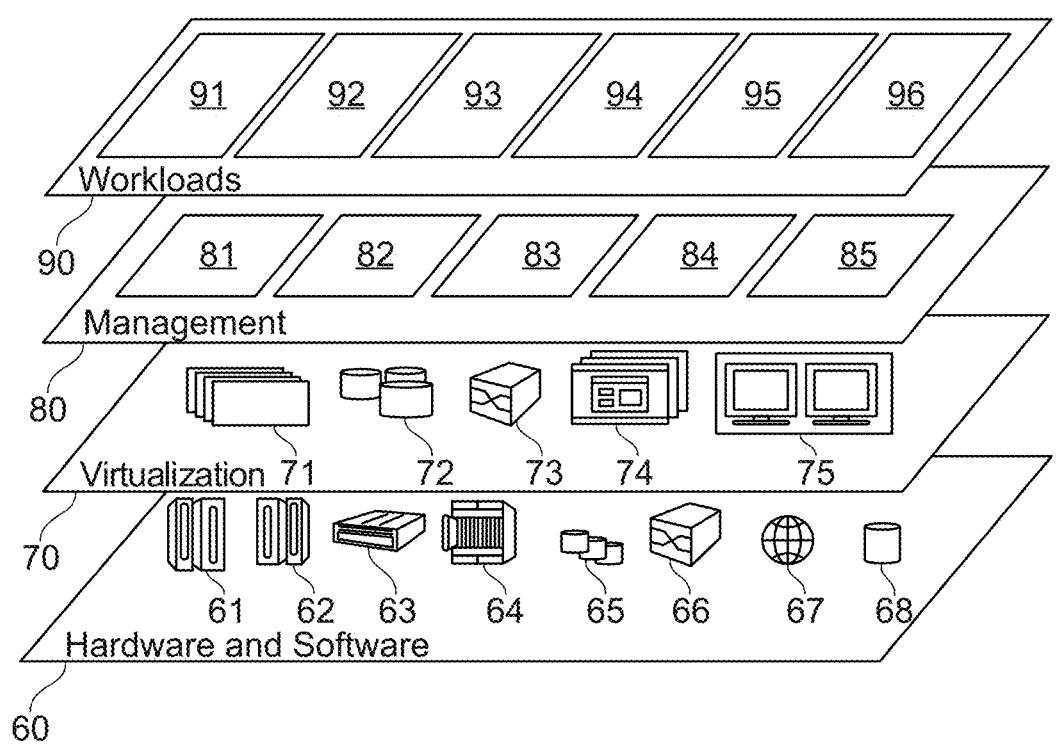
FIG. 3 depicts abstraction model, in accordance with embodiments of the present disclosure.

Referring now to FIG. 3, a set of functional abstraction layers provided by cloud computing environment 50 (FIG. 1) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. The database software 68 may for example be used to implement the source database and the target database as described above.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the implementation of a target database system 96 that uses a single recovery bookmark 400 as was described in the context of FIG. 1. In this example the target database system 96 may also provide data analytics processing.

Figure 4:
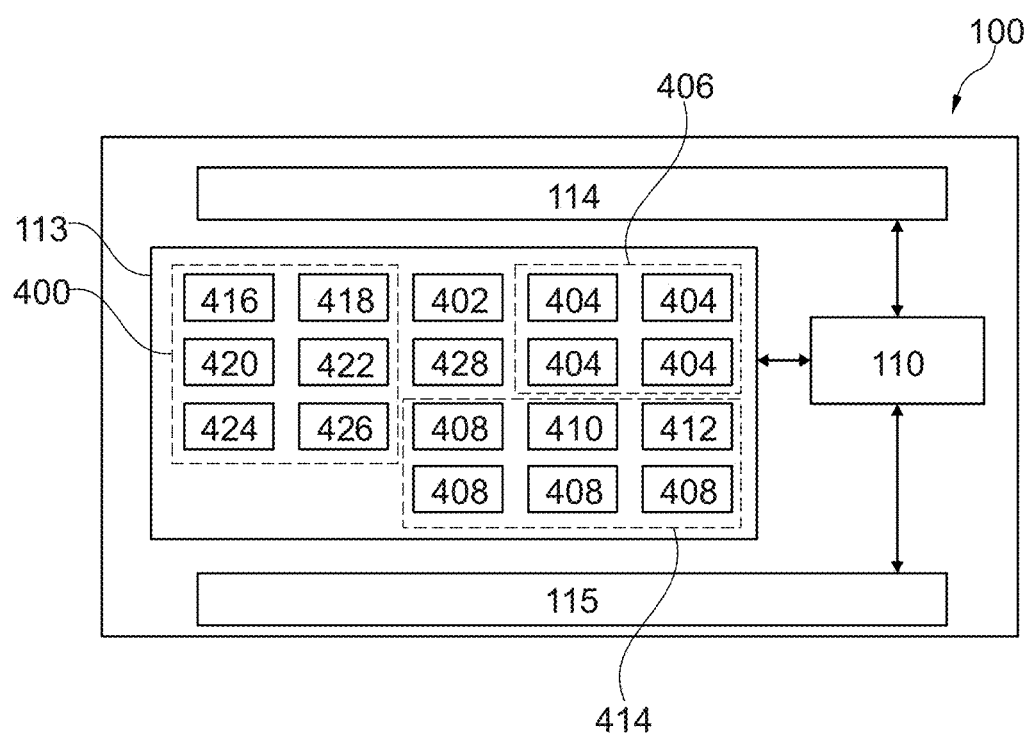
FIG. 4 shows a further view of the computing environment illustrated in FIG. 1, in accordance with embodiments of the present disclosure.

FIG. 4 illustrates a further view of the computing environment 100. Not all of the components of the computing environment 100 illustrated in FIG. 1 are illustrated in FIG. 4. The persistent storage 113 is shown as storing an example of the single recovery bookmark 400. The single recovery bookmark 400 is shown as containing an earliest open entry 416 for a previous batch of the multiple batches of database transactions, a latest commit entry for the previous batch 418, an earliest open entry 420 for the current batch of the multiple batches of database transactions, a latest commit entry 422 for the current batch, a transactional identifier 424 of the current batch, and a list of tables 426 to be processed in the current batch. The persistent memory 113 is further shown as containing an optional database engine 402 for implementing the target database system 96.

The persistent memory 113 is further shown as containing a copy of the multiple database tables 406 from the source database system. The copy of the multiple database tables 406 contains a number of individual database tables 404. The persistent memory 113 is further shown as storing multiple batches of database transactions 414. The multiple batches of database transactions 414 contain various batches of database transactions 408, the previous batch of database transactions 410, and the current batch of database transactions 412. During execution of the method each of the individual database transactions in the batch of database transactions 408 is the current batch of database transactions 412 for one iteration. The list of tables to be processed 426 in the current batch identifies particular database tables in the multiple database tables 406. The persistent memory 113 is further shown as storing an optional transaction log 428 that was copied from the source database system. In some examples the transaction log 428 resides on the source database system.

Figure 5:
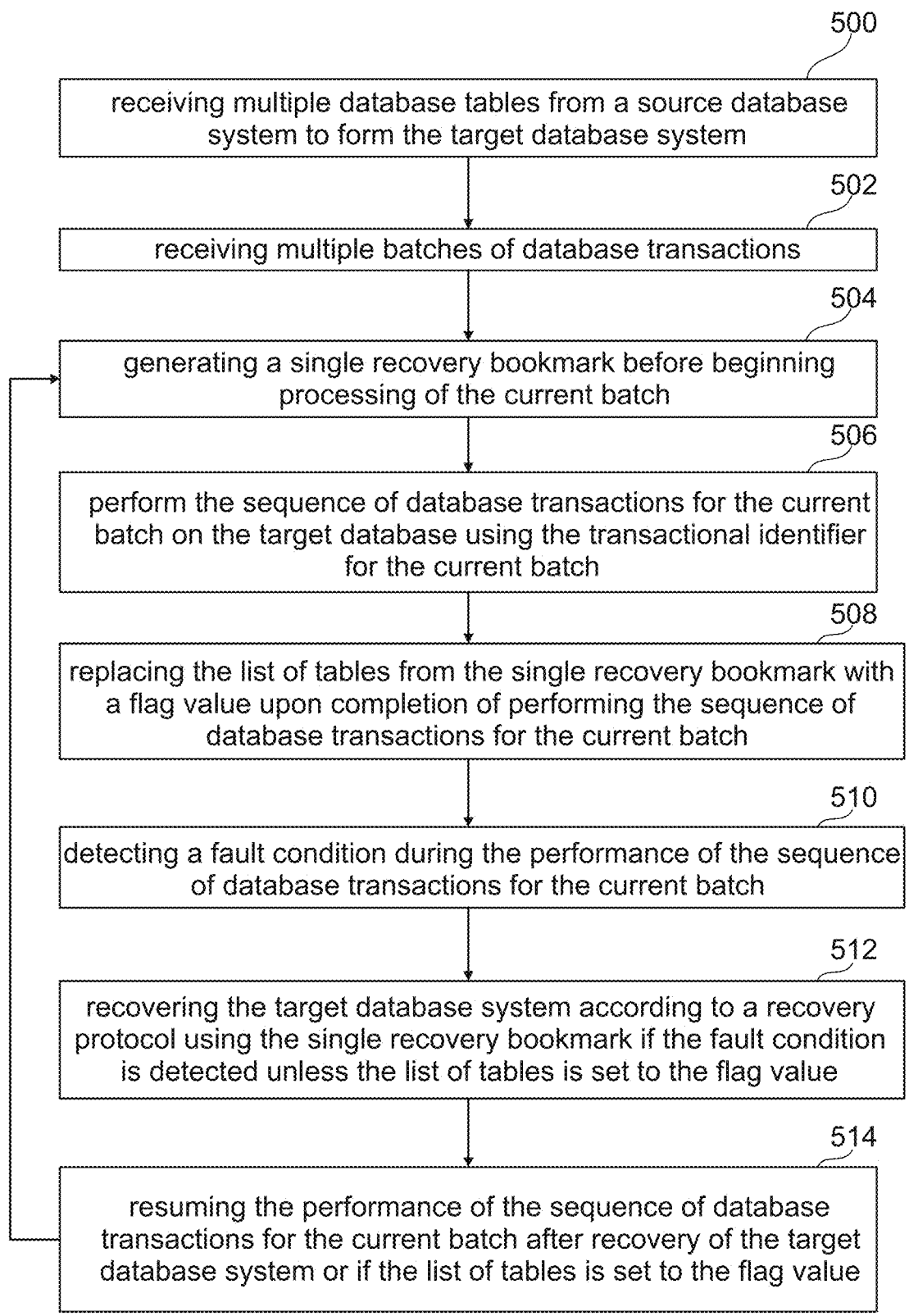
FIG. 5 shows a flow chart which illustrates a method of using the computing environment, in accordance with embodiments of the present disclosure.

FIG. 5 shows a flowchart which illustrates a method of operating the computing environment 100 illustrated in FIGS. 1 and 4. In operation 500, the multiple database tables 406 are received from a source database system to form the target database system 96. In operation 502, the multiple batches of database transactions 414 are received. In operation 504, the single recovery bookmark 400 is generated before beginning processing of the current batch 412 of database transactions. In operation 506, the sequence of database transactions is performed for the current batch on the target database using the transactional identifier for the current batch when the transactions are performed. In operation 508, upon completion, the list of tables 426 is replaced with a flag value upon completion of performing the sequence of database transactions for the current batch 412. In operation 510, a fault condition is detected during performance of the sequence of database transactions for the current batch 412. In operation 512, the target database system is recovered according to a recovery protocol using the single recovery bookmark 400 if the fault condition is detected unless the list of tables is set to the flag value. In operation 514, the performance of the sequence of database transactions is resumed for the current batch after recovery of the target database system or if the list of tables is set to the flag value. Operations 504, 506, 508, 510, 512, and 514 can be repeated for each of the batch of database transactions 408.

Figure 6:
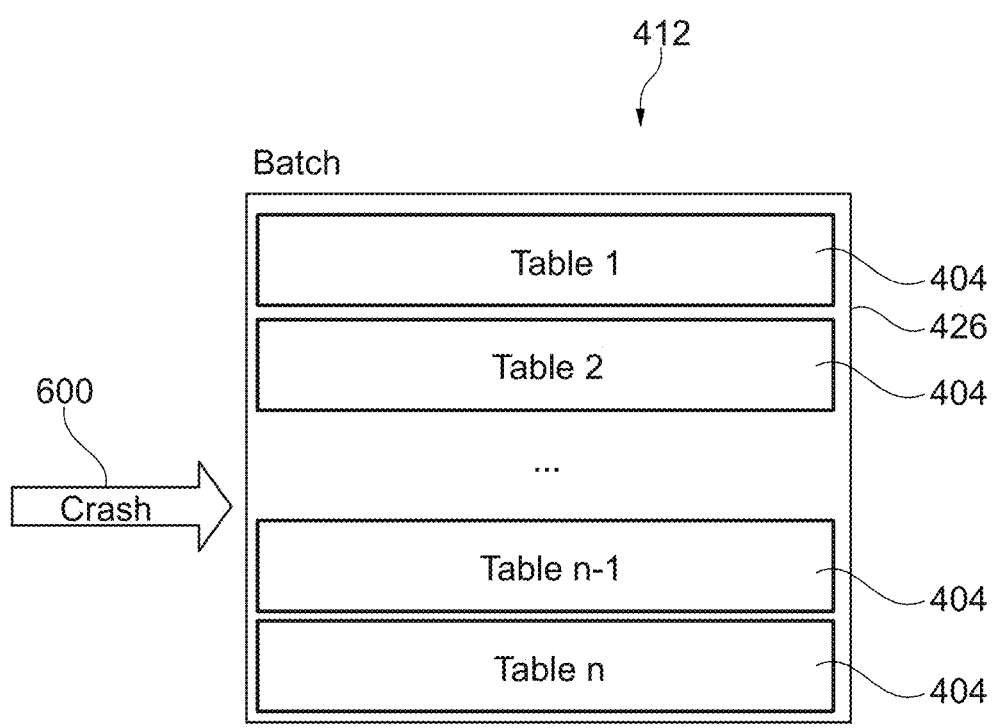
FIG. 6 illustrates an example of a fault condition during the performance of the sequence of database transactions for the current batch, in accordance with embodiments of the present disclosure.

FIG. 6 illustrates an example of a fault condition during the performance operation 506 of the sequence of database transactions for the current batch 412. The box 426 represents the list of tables to be processed in the current batch 412. Some of the tables are processed before the crash 600 and some are not. In a conventional system this would require all of the multiple database tables 406 to be recopied from the source database system. After the crash 600, all tables up to the table n−1 has successfully been committed and are visible for the query engine while the table n−1 and table n are not. Upon restart, the replication engine requires correction in order to have a consistent state for the query engine of the target database system 96.

Figure 7:
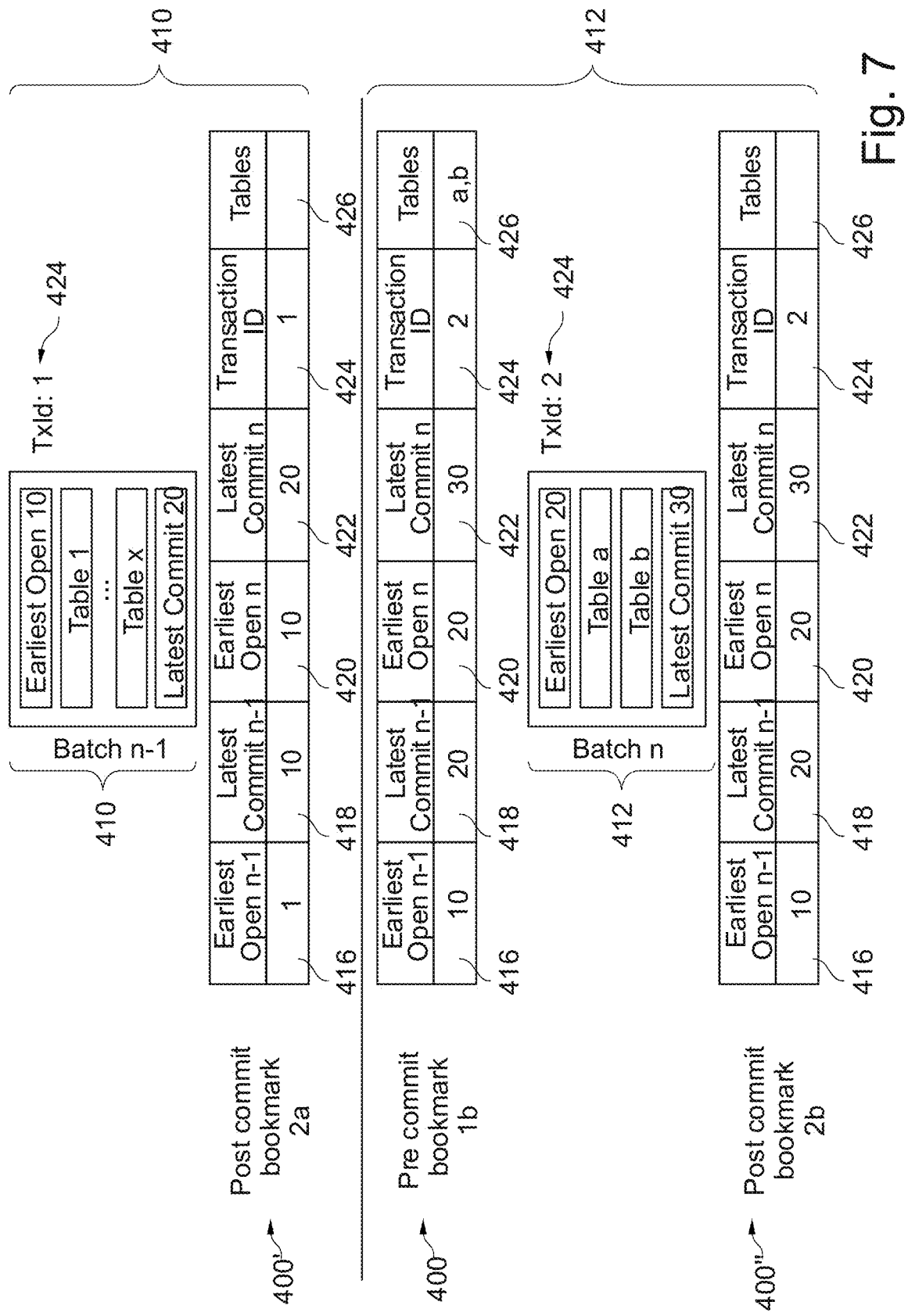
FIG. 7 illustrates the use of a single recovery bookmark, in accordance with embodiments of the present disclosure.

FIG. 7 illustrates the use of the single recovery bookmark 400. The bookmarks for the previous batch 410 (uses label n−1) and the current batch 412 (uses label n) are shown. Previous batch 410 represents the previous batch of database transactions, and current batch 412 represents the current batch of database transactions. In the previous batch 410 the single bookmark 400' for the previous post commit is shown. The single bookmark 400' for the previous batch post-commit has been populated using the transaction log 428. After the previous batch 410 has finished, a pre-commit bookmark for the single recovery bookmark 400 for the current batch 412 is constructed from the transaction log again. The earliest open 416, the latest commit 418 for the previous batch, then the earliest open 420 and latest commit 422 for the current batch are then populated into the bookmark 400. The transaction ID assigned is copied into the transaction ID 424 and the tables being edited are copied into the list of tables 426. The current batch is then processed and after the batch is finished the single bookmark 400" for the current batch post-commit is shown. In this case, the tables in list of tables 426 have been deleted to indicate that all of the transactions in the current batch 412 have been completed.

Figure 8:
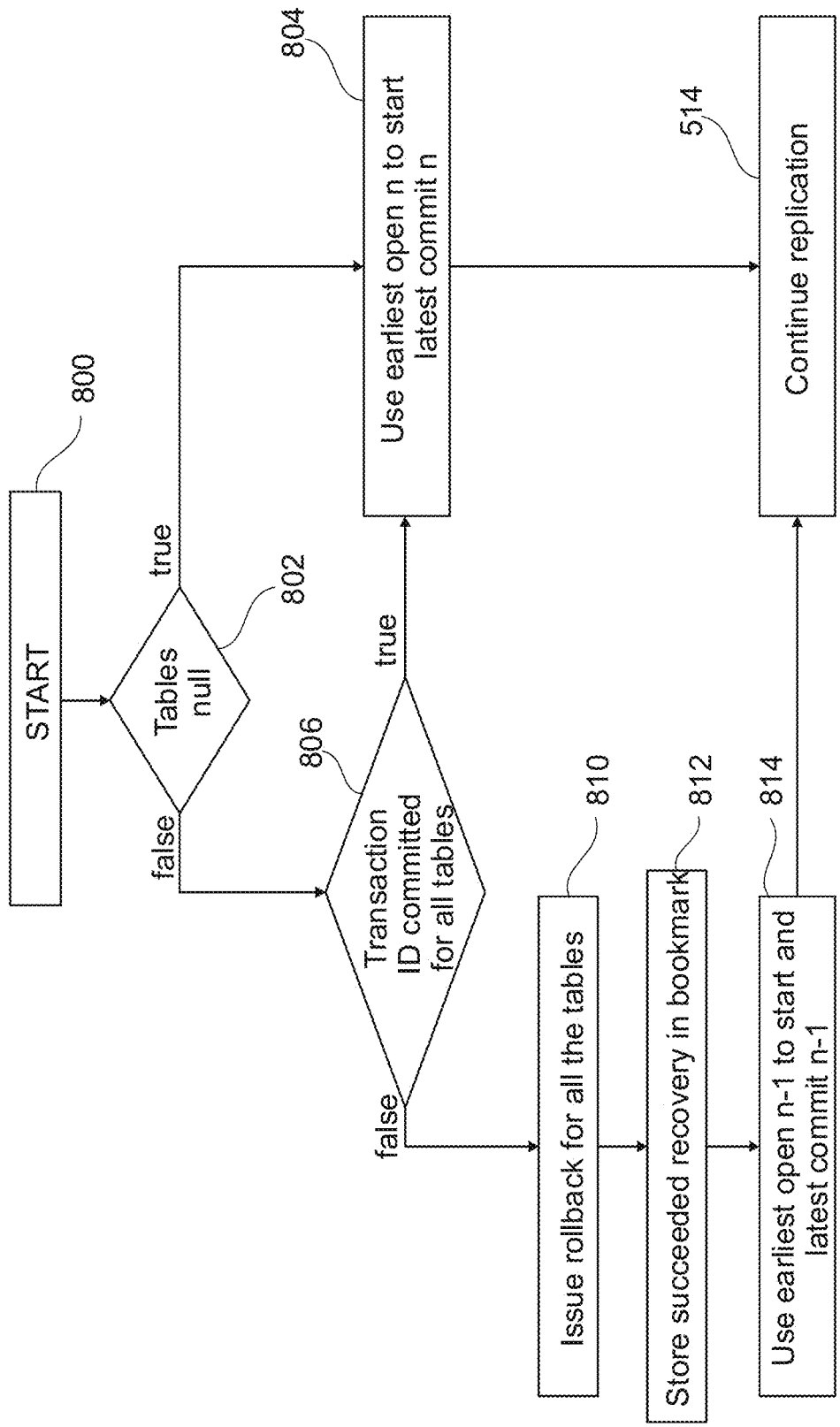
FIG. 8 illustrates an example of the recovery of the database system according to a recovery protocol, in accordance with embodiments of the present disclosure.

FIG. 8 illustrates an example of the recovery of the database system according to a recovery protocol 512. In this recovery protocol, the method starts at block 800. In block 802, the list of tables is checked to see if it is set to the flag value. If it is set to the flag value, the method proceeds to block 804. If the table field is not set to the flag value, the method proceeds to block 806. In block 804, the text says "use earliest open n to start and latest commit of the current batch (n)", which means that the current batch n proceeds as if the fault had not been detected. In this case, the method proceeds to operation 514 and the replication continues.

In block 806, the tables listed in the list of tables 426 are checked to see if the transactional identifier 424 is committed for all of these tables. If the answer is "true," then the method proceeds to block 804. If the answer is "false," the method proceeds to block 810. In block 810, all of the transactions for the transactional identifier 424 are rolled back and all of the tables listed in the list of tables 426. In block 812, the success of the recovery is stored in the bookmark. This may include deleting the tables listed in the list of tables 426. In block 814, the single recovery bookmark 400 is reset to the pre-commit bookmark 400 as illustrated in FIG. 7. This causes the performance of the sequence of database transactions to restart for the complete current batch 412 of database transactions. The method then returns to operation 514 and resumes the performance of the sequence of database transactions for the current batch.

Various examples may possibly be described by one or more of the following features in the following numbered clauses:

Clause 1. A computer implemented method of recovery of a target database system (96), the method comprising:
receiving (500) multiple database tables (406) from a source database system to form the target database system;
receiving (502) multiple batches (414) of database transactions, wherein at least some of the multiple batches comprise a sequence of database transactions;
wherein the method further comprises repeatedly performing the following for a current batch (412) of the multiple batches of database transactions:
generating (504) a single recovery bookmark (400) before beginning processing of the current batch, wherein the single recover bookmark comprises: an earliest open entry (416) for a previous batch (410) of the multiple batches of database transactions, a latest commit entry (418) for the previous batch, an earliest open entry (420) for the current batch, a latest commit entry (422) for the current batch, a transactional identifier (424) of the current batch, and list of tables (426) to be processed in the current batch, wherein the multiple database tables comprises tables in the list of tables;
performing (506) the sequence of database transactions for the current batch on the target database using the transactional identifier of the current batch;
replacing (508) the list of tables from the single recovery bookmark with a flag value upon completion of performing the sequence of database transactions for the current batch;
detecting (510) a fault condition (600) during the performance of the sequence of database transactions for the current batch;
recovering (512) the target database system according to a recovery protocol using the single recovery bookmark if the fault condition is detected unless the list of tables is set to the flag value; and
resuming (514) the performance of the sequence of database transactions for the current batch after recovery of the target database system or if the list of tables is set to the flag value.

Clause 2. The computer implemented method of claim 2, wherein the recovery protocol comprises bypassing the recovery protocol if the transactional identifier of the current batch has been committed to all tables in the list of tables.

Clause 3. The computer implemented method of claim 2 or 3, wherein the recovery protocol comprises:
issuing a rollback of transactions having the transactional identifier of the current batch that were made to tables in the list of tables;
copying the earliest open entry for the previous batch to the earliest open entry for the current batch;
copying the latest commit entry for the previous batch to the latest commit entry for the current batch; and
set the list of tables to the flag value.

Clause 4. The computer implemented method of claim 4, wherein the performance of the sequence of database transactions is resumed by completely restarting the current batch after setting the list of tables to the flag value.

Clause 5. The computer implemented method of any one of the preceding claims, wherein the source database comprises a transaction log, wherein the earliest open entry for the previous batch is a first open transaction in the transaction log for the previous batch, wherein the latest commit entry for the previous batch is a latest commit transaction in the transaction log for the previous batch, wherein the earliest open entry is a first open transaction in the transaction log for the current batch, and wherein the latest commit entry is a latest commit transaction in the transaction log for the current batch.

Clause 6. The computer implemented method of claim 5, wherein the current batch comprise a known number of database transactions, wherein the method further comprises calculating the latest commit entry for a next batch of the multiple batches of database transactions by adding the known number of database transactions to the earliest open entry of the current batch.

Clause 7. The computer implemented method of claim any one of the preceding claims, wherein the target database system is implemented using a hive catalog.

Clause 8. The computer implemented method of claim 7, wherein at least some of the tables in the list of tables is implemented using iceberg tables.

Clause 9. The computer implemented method of any one of the preceding claims, wherein the fault condition is any one of the following: a crash of the target database system, a restart of the target database system, a power failure in the target database system, and hardware failure in the target database system.

Clause 10. The computer implemented method of any one of the preceding claims, wherein the method of recovery of a target database system is a method of disaster recovery.

Clause 11. The computer implemented method of any one of the preceding claims, wherein the multiple batches of database transactions implement a replication of the source database to the target database.

Clause 12. The computer implemented method of any one of the preceding claims, wherein the method further comprises continually updating the target database via replication of the source database.

Clause 13. The computer implemented method of any one of the preceding claims, wherein the target database system implements an analytics accelerator for the source database system.

Clause 14. The computer implemented method of any one of the preceding claims, wherein the source database system is a transactional database system.

Clause 15. The computer implemented method of any one of the preceding claims, wherein at least part of the sequence of database transactions are parallel database transactions.

Clause 16. The computer implemented method of any one of the preceding claims, wherein the target database is a single table transaction database system.

Clause 17. A computer program product comprising a computer-readable storage medium having computer-readable program code embodied therewith, said computer-readable program code configured to implement the method of any one of claims 1 through 16.

Clause 18. A computer system comprising:
a processor configured for controlling said computer system; and
a memory storing machine executable instructions, execution of said instructions causes said processor to:
receive multiple database tables from a source database system to form the target database system; and
receive multiple batches of database transactions, wherein at least some of the multiple batches comprise a sequence of database transactions;
wherein the execution of said instructions cause the processor to repeatedly performing the following for a current batch of the multiple batches of database transactions:
generate a single recovery bookmark before beginning processing of the current batch, wherein the single recover bookmark comprises: an earliest open entry for a previous batch of the multiple batches of database transactions, a latest commit entry for the previous batch, an earliest open entry for the current batch, a latest commit entry for the current batch, a transactional identifier of the current batch, and list of tables to be processed in the current batch, wherein the multiple database tables comprises tables in the list of tables;
perform the sequence of database transactions for the current batch on the target database using the transactional identifier of the current batch;
replace the list of tables from the single recovery bookmark with a flag value upon completion of performing the sequence of database transactions for the current batch;
detect a fault condition during the performance of the sequence of database transactions for the current batch;
recover the target database system according to a recovery protocol using the single recovery bookmark if the fault condition is detected unless the list of tables is set to the flag value; and
resume the performance of the sequence of database transactions for the current batch after recovery of the target database system or if the list of tables is set to the flag value.

Clause 19. The computer system of claim 16, wherein the recovery protocol comprises bypassing the recovery protocol if the transactional identifier of the current batch has been committed to all tables in the list of tables.

Clause 20. The computer system of claim 17, wherein the recovery protocol comprises:
issuing a rollback of transactions having the transactional identifier of the current batch that were made to tables in the list of tables;
copying the earliest open entry for the previous batch to the earliest open entry for the current batch;
copying the latest commit entry for the previous batch to the latest commit entry for the current batch; and
set the list of tables to the flag value.

Clause 21. A computer-implemented data structure, wherein the computer-implemented data structure comprises a single recovery bookmark, wherein the single recover bookmark comprises: an earliest open entry for a previous batch of the multiple batches of database transactions, a latest commit entry for the previous batch, an earliest open entry a the current batch of the multiple batches of database transactions, a latest commit entry for the current batch, a transactional identifier of the current batch, and list of tables to be processed in the current batch.

Clause 22. The computer-implemented data structure of clause 21, wherein the earliest open entry for the previous batch is a first open transaction in a transaction log for the previous batch, wherein the latest commit entry for the previous batch is a latest commit transaction in a transaction log for the previous batch, wherein the earliest open entry is a first open transaction in the transaction log for the current batch, and wherein the latest commit entry is a latest commit transaction in the transaction log for the current batch.

What is claimed is:

1. A computer implemented method of recovery of a target database system, the method comprising:
receiving multiple database tables from a source database system to form the target database system; and
receiving multiple batches of database transactions, wherein a current batch of the multiple batches comprises a sequence of database transactions;
wherein the method further comprises performing, for the current batch of the multiple batches of database transactions:

generating a single recovery bookmark before beginning processing of the current batch, wherein the single recovery bookmark comprises: an earliest open entry for a previous batch of the multiple batches of database transactions, a latest commit entry for the previous batch, an earliest open entry for the current batch, a latest commit entry for the current batch, a transactional identifier of the current batch, and list of tables to be processed in the current batch, wherein the multiple database tables comprises tables in the list of tables;

performing the sequence of database transactions for the current batch on the target database using the transactional identifier of the current batch;

replacing the list of tables from the single recovery bookmark with a flag value upon completion of performing the sequence of database transactions for the current batch;

detecting a fault condition during the performance of the sequence of database transactions for the current batch;

recovering the target database system according to a recovery protocol using the single recovery bookmark if the fault condition is detected unless the list of tables is set to the flag value; and resuming the performance of the sequence of database transactions for the current batch after recovery of the target database system or if the list of tables is set to the flag value.

2. The computer implemented method of claim 1, wherein the recovery protocol comprises bypassing the recovery protocol if the transactional identifier of the current batch has been committed to all tables in the list of tables.

3. The computer implemented method of claim 2, wherein the recovery protocol comprises:

issuing a rollback of transactions having the transactional identifier of the current batch that were made to tables in the list of tables;

copying the earliest open entry for the previous batch to the earliest open entry for the current batch;

copying the latest commit entry for the previous batch to the latest commit entry for the current batch; and setting the list of tables to the flag value.

4. The computer implemented method of claim 1, wherein the performance of the sequence of database transactions is resumed by restarting the current batch after setting the list of tables to the flag value.

5. The computer implemented method of claim 1, wherein the source database comprises a transaction log, wherein the earliest open entry for the previous batch is a first open transaction in the transaction log for the previous batch, wherein the latest commit entry for the previous batch is a latest commit transaction in the transaction log for the previous batch, wherein the earliest open entry is a first open transaction in the transaction log for the current batch, and wherein the latest commit entry is a latest commit transaction in the transaction log for the current batch.

6. The computer implemented method of claim 5, wherein the current batch comprise a known number of database transactions, wherein the method further comprises calculating the latest commit entry for a next batch of the multiple batches of database transactions by adding the known number of database transactions to the earliest open entry of the current batch.

7. The computer implemented method of claim 1, wherein the target database system is implemented using a hive catalog.

8. The computer implemented method of claim 7, wherein at least some of the tables in the list of tables is implemented using iceberg tables.

9. The computer implemented method of claim 1, wherein the fault condition is a crash of the target database system.

10. The computer implemented method of claim 1, wherein the method of recovery of a target database system is a method of disaster recovery.

11. The computer implemented method of claim 1, wherein the multiple batches of database transactions implement a replication of the source database to the target database.

12. The computer implemented method of claim 1, wherein the method further comprises continually updating the target database via replication of the source database.

13. The computer implemented method of claim 1, wherein the target database system implements an analytics accelerator for the source database system.

14. The computer implemented method of claim 1, wherein the source database system is a transactional database system.

15. The computer implemented method of claim 1, wherein at least part of the sequence of database transactions are parallel database transactions.

16. The computer implemented method of claim 1, wherein the target database is a single table transaction database system.

17. A computer program product comprising one or more computer readable storage media, and program instructions collectively stored on the one or more computer readable storage media, the program instructions comprising instructions configured to cause one or more processors to perform a method of recovery of a target database system, the method comprising:

receiving multiple database tables from a source database system to form the target database system; and receiving multiple batches of database transactions, wherein a current batch of the multiple batches comprises a sequence of database transactions;

wherein the method further comprises performing, for the current batch of the multiple batches of database transactions:

generating a single recovery bookmark before beginning processing of the current batch, wherein the single recovery bookmark comprises: an earliest open entry for a previous batch of the multiple batches of database transactions, a latest commit entry for the previous batch, an earliest open entry for the current batch, a latest commit entry for the current batch, a transactional identifier of the current batch, and list of tables to be processed in the current batch, wherein the multiple database tables comprises tables in the list of tables;

performing the sequence of database transactions for the current batch on the target database using the transactional identifier of the current batch;

replacing the list of tables from the single recovery bookmark with a flag value upon completion of performing the sequence of database transactions for the current batch;

detecting a fault condition during the performance of the sequence of database transactions for the current batch;

recovering the target database system according to a recovery protocol using the single recovery bookmark if the fault condition is detected unless the list of tables is set to the flag value; and resuming the performance of the sequence of database transactions for the current batch after recovery of the target database system or if the list of tables is set to the flag value.

18. A computer system comprising:
a processor configured for controlling said computer system; and
a memory storing machine executable instructions, execution of said instructions causes said processor to perform a method of recovery of a target database system:
receive multiple database tables from a source database system to form a target database system; and
receive multiple batches of database transactions, wherein a current batch of the multiple batches comprises a sequence of database transactions;
wherein the execution of said instructions cause the processor to perform, for the current batch of the multiple batches of database transactions:
  generate a single recovery bookmark before beginning processing of the current batch, wherein the single recovery bookmark comprises: an earliest open entry for a previous batch of the multiple batches of database transactions, a latest commit entry for the previous batch, an earliest open entry for the current batch, a latest commit entry for the current batch, a transactional identifier of the current batch, and list of tables to be processed in the current batch, wherein the multiple database tables comprises tables in the list of tables;
  perform the sequence of database transactions for the current batch on the target database using the transactional identifier of the current batch;
  replace the list of tables from the single recovery bookmark with a flag value upon completion of performing the sequence of database transactions for the current batch;
  detect a fault condition during the performance of the sequence of database transactions for the current batch;
  recover the target database system according to a recovery protocol using the single recovery bookmark if the fault condition is detected unless the list of tables is set to the flag value; and
  resume the performance of the sequence of database transactions for the current batch after recovery of the target database system or if the list of tables is set to the flag value.

19. The computer system of claim 18, wherein the recovery protocol comprises bypassing the recovery protocol if the transactional identifier of the current batch has been committed to all tables in the list of tables.

20. The computer system of claim 19, wherein the recovery protocol comprises:
  issuing a rollback of transactions having the transactional identifier of the current batch that were made to tables in the list of tables;
  copying the earliest open entry for the previous batch to the earliest open entry for the current batch;
  copying the latest commit entry for the previous batch to the latest commit entry for the current batch; and
  setting the list of tables to the flag value.

* * * * *